United States Patent
Raisch et al.

(10) Patent No.: US 12,228,193 B2
(45) Date of Patent: *Feb. 18, 2025

(54) TRANSMISSION UNIT, TRANSMISSION ARRANGEMENT, AND AGRICULTURAL TOWING VEHICLE

(71) Applicant: DEERE & COMPANY, Moline, IL (US)

(72) Inventors: Stefan Raisch, Vaihingen/Enz (DE); Rainer Gugel, Plankstadt (DE); Frank Buhrke, Birkenau (DE); David Mueller, Dettenheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/040,023

(22) PCT Filed: Aug. 24, 2021

(86) PCT No.: PCT/EP2021/073358
§ 371 (c)(1),
(2) Date: Jan. 31, 2023

(87) PCT Pub. No.: WO2022/048947
PCT Pub. Date: Mar. 10, 2022

(65) Prior Publication Data
US 2023/0272843 A1    Aug. 31, 2023

(30) Foreign Application Priority Data

Sep. 1, 2020 (DE) .......................... 10 2020 122 827
Sep. 1, 2020 (EP) ........................................ 20193895

(51) Int. Cl.
*F16H 3/089* (2006.01)
*F16H 3/00* (2006.01)
*F16H 3/08* (2006.01)

(52) U.S. Cl.
CPC .......... *F16H 3/089* (2013.01); *B60Y 2200/22* (2013.01); *F16H 3/006* (2013.01);
(Continued)

(58) Field of Classification Search
CPC .. F16H 3/006; F16H 3/089; F16H 2003/0826; F16H 2200/0004; F16H 2200/0052
See application file for complete search history.

(56) References Cited

U.S. PATENT DOCUMENTS 7,445,103 B2 * 11/2008 Fink ...................... F16D 23/025
192/113.34
7,748,286 B2    7/2010 Baldwin
(Continued)

FOREIGN PATENT DOCUMENTS

DE         2052350 A1    4/1972
DE   102011076386 A1   11/2012
(Continued)

OTHER PUBLICATIONS

European Search Report issued in application No. 23185457.1, dated Oct. 10, 2023, 8 pages.
(Continued)

*Primary Examiner* — William C Joyce (57) ABSTRACT

A transmission unit for a drivetrain of an agricultural towing vehicle including a first clutch, a second clutch, a first input shaft, a second input shaft, and an output shaft, wherein the first clutch is connected to the first input shaft and the second clutch is connected to the second input shaft. The transmission unit includes a plurality of gear sets for establishing a plurality of gear ratio stages. Each of the plurality of gear sets including a shift wheel rotatably mounted on the output shaft and a fixed wheel arranged on one of the first and second input shafts. The shift wheels of a second gear set and a third gear set of the plurality of gear sets can be
(Continued)

selectively coupled to a shift element such that at least one winding path gear ratio stage can be formed via the second and the third gear sets.

19 Claims, 8 Drawing Sheets

(52) U.S. Cl.
CPC ............. *F16H 2003/0826* (2013.01); *F16H 2200/0004* (2013.01); *F16H 2200/0052* (2013.01)

(56) References Cited

U.S. PATENT DOCUMENTS

| | | | |
|---|---|---|---|
| 10,086,686 B2 * | 10/2018 | Mueller | ............... B60W 10/111 |
| 10,859,144 B2 | 12/2020 | Buhrke | |
| 2017/0114865 A1 | 4/2017 | Gugel et al. | |
| 2020/0325987 A1 * | 10/2020 | Nishimoto | ............... B60K 5/04 |

FOREIGN PATENT DOCUMENTS

| | | |
|---|---|---|
| DE | 102013110709 A1 | 4/2015 |
| DE | 102015206881 A1 | 10/2016 |
| DE | 102015224647 A1 | 6/2017 |
| DE | 102016220701 A1 | 4/2018 |
| DE | 102019202962 A1 | 9/2020 |
| EP | 3091253 A1 | 11/2016 |
| WO | WO2008142523 A2 | 11/2008 |
| WO | WO2009050078 A2 | 4/2009 |
| WO | WO2019091953 A1 | 5/2019 |

OTHER PUBLICATIONS

German Search Report issued in application No. 102020122827.9, dated May 20, 2021, 8 pages.

Magna Getrag 6DCT150 transmission, News Release—Magna Joint Venture Begins Production of Dual-clutch Transmissions in Wuhan, China, <URL: https://www.magna.com/company/newsroom/releases-archive/release/2016/04/27/news-release---magna-joint-venture-begins-production-of-dual-clutch-transmissions-in-wuhan-china>, 4 pages.

Daimler 8G-DCT transmission, Mercedes Benz 8G-DCT Transmission-less rain, <URL: https://archive.lessrain.com/projects/mercedes-benz-8g-dct-transmission>, 7 pages.

6DCT150 Transmission Catalogue—Automatic Choice, <URL: https://www.automaticchoice.Com/en/getrag-6dct150-powershift-dual-clutch-transmission-parts-catalogue>, 3 pages.

Ing. Pascal Théry, The Power Transfer DCT, 5th International CTI Symposium, Dec. 4-7, 2006, Berlin, Germany, 34 pages.

European Search Report issued in application No. 20193895.8, dated Jan. 26, 2021, 8 pages.

International Search Report issued in application No. PCT/EP2021/073352, dated Oct. 11, 2021, 14 pages.

International Search Report issued in application No. PCT/EP2021/073358, dated Oct. 8, 2021, 13 pages.

* cited by examiner

|   | C1 | C2 | B-D | C-E | W |
|---|----|----|-----|-----|---|
| A | X  |    | B   |     | W |
| B |    | X  | B   |     |   |
| C | X  |    |     | C   |   |
| D |    | X  | D   |     |   |
| E | X  |    |     | E   |   |
| F |    | X  |     | E   | W |

| Gear | Gear ratio stage | Speed [km/h] |
|---|---|---|
| 1 | A1 | 2.14 |
| 2 | A2 | 2.58 |
| 3 | A3 | 3.09 |
| 4a | A4 | 3.79 |
| 4b | B1 | 3.78 |
| 5 | B2 | 4.55 |
| 6 | B3 | 5.46 |
| 7a | B4 | 6.68 |
| 7b | C1 | 6.69 |
| 8 | C2 | 8.06 |
| 9 | C3 | 9.65 |
| 10a | C4 | 11.82 |
| 10b | D1 | 11.82 |
| 11 | D2 | 14.23 |
| 12 | D3 | 17.04 |
| 13a | D4 | 20.87 |
| 13b | E1 | 20.82 |
| 14 | E2 | 25.08 |
| 15 | E3 | 30.03 |
| 16a | E4 | 36.79 |
| 16b | F1 | 36.76 |
| 17 | F2 | 44.27 |
| 18 | F3 | 53.02 |
| 19 | F4 | 64.95 |

FIG. 6

TRANSMISSION UNIT, TRANSMISSION ARRANGEMENT, AND AGRICULTURAL TOWING VEHICLE

CROSS-REFERENCE TO RELATED APPLICATIONS

This application is a National Stage of PCT Application No. PCT/EP2021/073358, filed Aug. 24, 2021, which claims the benefit of and priority to German Patent Application No. 102020122827.9, filed Sep. 1, 2020, and European Patent Application No. 20193895.8, filed Sep. 1, 2020, which are hereby incorporated by reference.

FIELD OF THE DISCLOSURE

The disclosure relates to a transmission unit, to a transmission arrangement, and to an agricultural towing vehicle.

BACKGROUND

For a long time, in agricultural towing vehicles use has been made of transmission arrangements in order to be able to change the propulsion of the towing vehicle, even under high tensile load, for example caused by a work implement hitched thereto, such as a soil cultivation tool (for example a plow) or the like, by it simply being possible to change the drive motor speed.

SUMMARY

In this respect, the transmission arrangement may be for example a powershift transmission arrangement. A known measure is to increase the number of gear ratio stages of a transmission arrangement by said arrangement comprising a combination of transmissions, for example by combining a transmission device with a transmission unit. DE 10 2013 110 709 A1 discloses such a transmission arrangement. The transmission units used in that document may in turn be known from WO 2009/050078 A2 as dual clutch transmissions. DE 10 2013 110 709 A1 further discloses that, when the transmission unit can shift for example into two different gear ratio stages or transmission ratios, for example group gear ratio stages or transmission ratios in the group range, the transmission arrangement makes it possible to double the available transmission ratios in relation to a single transmission device, for example a multi-stage transmission. This is achieved in that firstly, in the low (first) group gear ratio stage, the originally available gear ratio stages of the transmission device, for example the powershift ratio stages of the multi-stage transmission, are shifted from 1 to n in sequence and then, in the high (second) group gear ratio stage, the gear ratio stages or powershift ratio stages are shifted from 1 to n in sequence again. A disadvantage of the known transmission arrangements is that they have excessively high startup speeds and too many gear sets and/or toothed wheels. Furthermore, the time needed to shift the known transmission arrangements is long, the installation space required is excessively large and the service life is excessively short.

Taking this prior art as a starting point, an object of the present disclosure is therefore to propose a transmission unit, a transmission arrangement and an agricultural towing vehicle which largely avoid the disadvantages known from the prior art, for example to realize a transmission unit, a transmission arrangement and an agricultural towing vehicle which have a simpler design and/or require less installation space and/or additional transmission ratios in the group range, for example at the same time having reduced installation space, and/or being maintenance-free or being less complex in maintenance terms.

This object is achieved by a transmission unit disclosed, by a transmission arrangement disclosed herein, and by an agricultural towing vehicle disclosed herein. Additional advantages are disclosed in the following embodiments.

According to the disclosure, what is proposed is a transmission unit for a drivetrain of an agricultural vehicle, for example a towing machine, such as a tractor or a construction machine. The transmission unit comprises a first clutch and a second clutch, wherein the input side, for example a common input side, of the first and the second clutch is drivable. The transmission unit further comprises a first input shaft and a second input shaft and an output shaft, for example one output shaft. The first clutch is rotationally fixedly connected to the first input shaft and the second clutch is rotationally fixedly connected to the second input shaft. Shift wheels, for example toothed wheels or toothed gearwheels, are rotatably mounted on the output shaft and fixed wheels, for example toothed wheels, are rotationally fixedly arranged on the first and the second input shaft and for example can at least partially engage with the shift wheels. The transmission unit has a plurality of gear sets, for example at least two, or four or more gear sets, for setting up gear ratio stages, for example group gear ratio stages. To that end, at least one first gear set, for example one first gear set, and at least one second gear set, for example one second gear set, each have the fixed wheel on the first input shaft and the shift wheel on the output shaft. Moreover, at least one third gear set, for example one third gear set, and at least one fourth gear set, for example one fourth gear set, each have the fixed wheel on the second input shaft and the shift wheel on the output shaft. Furthermore, the transmission unit comprises a shift element for coupling two shift wheels, wherein for example the shift element can be rotatably mounted on the output shaft or can be non-rotationally fixedly connected to the output shaft. In this case, the shift wheel of the second gear set and the shift wheel of the third gear set can be coupled, for example selectively coupled, to the shift element in such a way that at least one winding path gear ratio stage can be formed via the second and the third gear set. In this respect, the shift wheel of the second gear set and the shift wheel of the third gear set may be couplable for example in combination with the first or the fourth gear set, that is to say for example when the first or the fourth gear set is also established by a coupling element on the output shaft.

In other words, the shift wheel of the second gear set, the shift wheel of the third gear set, and the shift element may be arranged on the output shaft in such a way, and for example the shift wheel of the second gear set and the shift wheel of the third gear set can be connected and released by means of the shift element in such a way, that at least one winding path gear ratio stage can be shifted via the shift element. In this context, the power flow of the winding path gear ratio stage may wind via at least three gear sets with intermeshing fixed wheels and shift wheels.

The first and/or the second clutch may be in the form of powershift clutches, for example multi-plate clutches (or dry single-disk clutches), such as friction clutches. The first and/or the second clutch may, however, also be in the form of non-powershift clutches. The first and/or the second clutch and the first and/or the second transmission input shafts may be arranged axially parallel to and/or coaxially with one another.

On the output side, the output shaft may be assigned to the transmission unit. The transmission unit may comprise a clutch drive shaft on the input side, that is to say as input side, for example as common input side. However, the input side may also comprise a first and a second clutch drive shaft. The clutch drive shaft may be in the form of a hollow shaft. The first clutch can be moved and/or shifted between an open state, in which the clutch drive shaft is released in terms of drive from the first input shaft, and a closed state, in which the clutch drive shaft is in drive connection with the first input shaft. The second clutch can likewise be moved and/or shifted between an open state, in which the clutch drive shaft is released in terms of drive from the second input shaft, and a closed state, in which the clutch drive shaft is in drive connection with the second input shaft.

The first and/or the second input shaft may be placed in drive connection with the output shaft. The first and/or the second input shaft may be in the form of hollow shafts. Moreover, the first and/or the second input shaft may be arranged coaxially with one another and/or one in the other, for example one in the other so as to be able to freely rotate. The transmission unit may comprise one or more air pressure seals which can be integrated in the output shaft and/or the first and/or the second input shaft.

The transmission unit moreover comprises the shift element, for example one shift element, for example for coupling the shift wheels of the second and the third gear set. For this purpose, the shift element may be arranged on the output shaft between the second and the third gear set, and for example rotatably mounted on the output shaft. The two shift wheels may be rotationally fixedly and releasably connectable to the shift element, wherein the two coupled shift wheels for example may be rotationally fixedly and/or loosely arranged on the output shaft. In this context, the two rotatably mounted shift wheels of the second and the third gear set may be couplable via the shift element in such a way that a rotationally fixed connection can be produced depending on a shifting state of the shift element between the two shift wheels, with the result that the two shift wheels can be rotated at the same speed. In other words, the two shift wheels may be connected to the shift element in such a way that the first and the second input shaft can be placed in dependence on one another. In some embodiments, in the case of a winding path gear ratio stage, the shift wheel of the second gear set and the shift wheel of the third gear set are thus coupled to one another in order to realize a common force flow and power flow through the first and the second input shaft as a result.

In some embodiments, the transmission unit may comprise two input shafts, i.e., the first and the second input shaft, one output shaft, and two clutches. Moreover, the transmission unit may comprise four gear sets. The first gear set may comprise a first fixed wheel of the first input shaft, which meshes with a first shift wheel of the output shaft. The second gear set may comprise a second fixed wheel of the first input shaft, which may be in engagement with a second shift wheel of the output shaft. The third gear set may comprise a third fixed wheel of the second input shaft, which can mesh with a third shift wheel of the output shaft. The fourth gear set may comprise a fourth fixed wheel of the second input shaft, which may be in engagement with the shift wheel, for example a fourth shift wheel, of the output shaft.

If a winding path gear ratio stage is shifted, two of the shift wheels, that is to say for example the second and the third shift wheel, may be rotationally fixedly connected to one another by the shift element and at the same time the first or the fourth gear set can be actuated, that is to say at the same time the first shift wheel is connected to the output shaft by a first coupling element or the fourth shift wheel is connected to the output shaft by a second coupling element. The transmission unit may this comprise six gear ratio stages or group gear ratio stages, which for example are power-shiftable. The transmission unit may thus have four gear ratio stages which are shiftable via one gear set, and two gear ratio stages which are shiftable as winding path gear ratio stages. In addition, the second and the third shift wheel may be couplable in such a way that, for example when the first or the fourth gear set is also established by a coupling element on the output shaft, two further gear ratio stages may be realized as winding path gear ratio stages. The first and the sixth gear ratio stage may for example be a winding path gear, that is to say be realized as a winding path gear ratio stage. The size of the steps between the individual gear ratio stages A to F may be constant and/or lie in a range of 1.2 to 2.4, for example lie in a range of 1.46 to 2.14, or may be 1.77.

Winding path gear ratio stages are advantageously realized with the transmission unit according to the disclosure and, owing to the multiple uses of individual gear sets, it is possible to dispense with components when designing the transmission unit. Since the transmission unit for example is a dual clutch transmission which has two winding path gear ratio stages and is shiftable into different transmission ratios, for example is shiftable into six gear ratio stages, it is thus possible to advantageously realize a maximum number of gear ratio stages with a minimum number of shafts and toothed wheels in the transmission unit. This makes it possible to advantageously achieve a very small installation space or structural space in the agricultural towing vehicle and an optimally simple design of the transmission unit Advantageously, the transmission unit also makes it possible to perform powershifts. It is moreover possible, in comparison with transmission units with a comparable number of shafts and toothed wheels, to realize additional transmission ratios, so that the transmission unit according to the disclosure achieves improved transmission spread and more gear ratio stages. Moreover, higher driving speeds and lower startup speeds are enabled, as a result of which the towing vehicle can realize operation at slow speeds. The simple way in which the transmission unit is designed makes it possible to dispense with additional toothed wheel ratio stages, as a result of which weight and thus fuel costs in turn can be saved. Moreover, the smaller installation space makes it possible, on account of the shorter distance between wheels, for the towing vehicle to become more versatile and more compact and/or the saved installation space can be used for other functions/assemblies. Another advantage are the shorter distances between wheels, as a result of which shorter shafts can be used. Shorter shafts in turn ensure less shaft bending and thus a longer bearing and toothset service life.

In one configuration of the disclosure, the shift element is movable between a first shift position, in which the shift wheel of the second gear set and the shift wheel of the third gear set are coupled, and a second shift position, in which the shift wheel of the second gear set and the shift wheel of the third gear set are released from one another. This advantageously achieves the advantages stated above.

In an exemplary embodiment which is advantageous from a design perspective, the transmission unit comprises one or more coupling elements, for example two coupling elements, that is to say for example a first and a second coupling element, wherein the shift wheel with one of the coupling elements is rotationally fixedly and releasably connectable to the output shaft, for example a respective one of the shift wheels with one of the coupling elements is rotationally fixedly and releasably connectable to the output shaft. The coupling element(s) may be rotationally fixedly and axially displaceably mounted on the output shaft and/or be movable, for example axially movable, by means of an actuating element, and/or the coupling elements are arranged respectively between two shift wheels, wherein for example the fixed wheels assigned to the shift wheels are arranged on the same input shaft, that is to say the first or the second input shaft. In some embodiments, the transmission unit has a first and a second coupling element, for example one first and one second coupling element. The first coupling element may be arranged between the first and the second gear set, and the second coupling element may be arranged between the third and the fourth gear set on the output shaft. The coupling elements may be designed in a form known per se as dog clutches or actuating mechanisms, for example sliding sleeves, and shift assemblies, comprising synchronizing rings, or synchronizers. In any case, the coupling elements are coupling means which are rotationally fixedly and axially displaceably arranged on the output shaft and with which the shift wheels can be rotationally fixedly connected to the output shaft for the purpose of shifting a transmission ratio. The axial displacement of the coupling elements may be affected via the actuating element. To that end, the transmission unit may comprise corresponding actuating elements or for example each coupling element may comprise a respective actuating element. The shift assembly or synchronizers may comprise actuating mechanisms or sliding sleeves that are axially displaceable on the output shaft but rotationally fixedly connected to the output shaft, and synchronizing rings that are axially directly adjacent, that is to say arranged on the right and/or left of the actuating mechanism or the sliding sleeve. The actuating mechanism, sliding sleeve or the actuating element may be actuable manually or in a power-assisted manner for the purpose of actuating the coupling elements. To that end, the transmission unit, for example, may comprise an actuator, for example a piston-cylinder arrangement, with the result that the actuating mechanism or actuating element can be actuated in a power-assisted manner. The actuator, for example the piston-cylinder arrangements, may be drivable by a hydraulic or pneumatic pressure medium. In the embodiment variant described above, the respectively specified direction in which the coupling elements are displaced to connect the desired shift wheel to the respective output shaft may be changeable by modifying the coupling elements e.g., by way of corresponding deflection elements.

In an embodiment of the transmission unit, the shift element is arranged between two coupling elements along, for example on, the output shaft. The shift element may be in the form of a dog clutch or an actuating mechanism, for example a sliding sleeve, and a shift assembly, comprising a synchronizing ring, or synchronizer. The shift element may be axially displaceably mounted on the output shaft and/or be movable, for example axially movable, by means of an actuating element. The shift element is for example in the form of a synchronizer, for example a synchronizer acting on one side. Similarly, the shift element may be in the form of a freely rotating sliding sleeve which is axially displaceable on the output shaft, for example a freely rotating sliding sleeve which is axially displaceable in one direction. The shift element may moreover comprise one or more synchronizing rings, which can for example be assigned to the sliding sleeve. The synchronizing rings may be arranged axially on one or both sides, for example only on one side of the sliding sleeve, that is to say for example be arranged on the right or left of the sliding sleeve. However, the shift element may also be in the form of dog clutches or a shift assembly. This makes it possible to realize the above-mentioned advantages of the transmission unit.

In one configuration of the disclosure, the highest gear ratio stage and the lowest gear ratio stage are realized as a winding path gear ratio stage and/or the highest gear ratio stage uses, inter alia, the gear set of the previous gear ratio stage and/or the lowest gear ratio stage uses, inter alia, the gear set of the next highest gear ratio stage. However, in this embodiment variant other assignments of the gear ratio stages with respect to the first and the second clutch are also possible. For example, it is possible to realize a reverse assignment in a very simple way, e.g., by way of a mirrored arrangement. Advantageously, with the winding path gear ratio stage, in the lowest gear ratio stage the transmission ratio is a product of three transmission ratio stages, as a result of which a larger transmission ratio can be achieved than by just one transmission ratio using one gear set. This enables a lowest gear at slower speeds than without a winding path gear ratio stage. It is also advantageous that additionally, in combination with the winding path gear ratio stage, in the highest gear ratio stage the transmission ratio is likewise a product of three transmission ratio stages and in the highest gear ratio stage higher speeds can be achieved than without a winding path gear ratio stage. This enables a highest gear at higher speeds than without a winding path gear ratio stage.

In some embodiments, a rear-axle bevel gear drive is connected, for example rotationally fixedly connected, to the output shaft. Advantageously, on account of the direct connection of the output shaft to the rear-axle bevel gear drive, it is possible to dispense with expensive connecting elements, for example an articulated shaft, that tend to need maintenance. Moreover, the output shaft is connected to a toothset of a front-axle drive. To that end, a front-axle drive wheel may be connected to the output shaft, for example rotationally fixedly connected to the output shaft, or be selectively rotationally fixedly connectable thereto and releasable therefrom. However, the front-axle drive wheel may also be arranged independently of the output shaft, that is to say for example be in the form of part of the front-axle drive. In this respect, the front-axle drive wheel may be in engagement with a toothed wheel on the output shaft, that is to say for example a front-axle gear. The front-axle gear may be connected, for example rotationally fixedly connected, to the output shaft, or selectively rotationally fixedly connectable thereto or releasable therefrom. Advantageously, the front-axle drive may thus be connected to the rear-axle bevel gear drive by means of the output shaft. Moreover, advantageously the output shaft additionally takes on the function of connecting a front and rear vehicle axle, as a result of which it is possible to dispense with a further connecting element. Similarly, the output shaft may be connected to a parking lock wheel. The parking lock wheel may be connected to the output shaft, for example rotationally fixedly connected to the output shaft, or be selectively rotationally fixedly connectable thereto and releasable therefrom. However, the parking lock wheel may also be arranged independently of the output shaft, that is to say for example be in the form of part of a parking lock. In this respect, the parking lock wheel may be in engagement with a toothed wheel on the output shaft, that is to say for example a parking lock wheel. In this respect, the parking lock wheel may be connected, for example rotationally fixedly connected, to the output shaft, or selectively rotationally fixedly connectable thereto or releasable therefrom. The parking lock wheel and the front-axle drive wheel may be two separate toothed wheels. Similarly, the parking toothed wheel and the front-axle gear may be two separate toothed wheels. This advantageously makes it possible to ensure greater durability and/or a longer service life of the structure. However, the parking lock wheel and the front-axle drive wheel may also be incorporated in one and the same toothed wheel, that is to say be in the form of a single toothed wheel. Similarly, the parking toothed wheel and the front-axle gear may be incorporated in one and the same toothed wheel, that is to say be in the form of a single toothed wheel. This reduces the installation space, the weight, and the material outlay.

In one configuration of the disclosure, the pinion of the rear-axle bevel gear drive is in the form of part of the output shaft, for example is integrated in the output shaft. Advantageously, this makes it possible to achieve a very compact design, which saves on structural space and transmission length.

An advantageous refinement of the transmission unit, but for example also of the transmission arrangement, provides that a power takeoff drive shaft (PTO drive shaft) is arranged in the first and the second input shaft. The power takeoff drive shaft may be in the form of a solid shaft. The transmission unit, but for example also the transmission arrangement, may thus have a shaft leadthrough for a power takeoff drive of the agricultural vehicle. To that end, the first and the second input shaft of the transmission unit and/or the clutch drive shaft may be in the form of hollow shafts and may incorporate the power takeoff drive shaft for the purpose of driving a power takeoff transmission. Expediently, the first and the second clutch may also have a central leadthrough for the power takeoff drive shaft. In this way, direct and thus particularly energy-efficient drive-power transmission from the drive motor to a power takeoff shaft output of the tractor is possible.

In one configuration of the disclosure, the transmission unit comprises six gear ratio stages, for example precisely six gear ratio stages, such as six powershiftable gear ratio stages, and/or the first and the sixth gear, that is to say the lowest and the highest gear, are realized as a winding path gear ratio stage. This advantageously achieves optimum transmission stepping, which is ideal for the full scope of operating ranges of agricultural towing vehicles.

The disclosure also relates to a transmission arrangement for a drivetrain of an agricultural towing vehicle, for example for a tractor or a construction machine, in order to connect a drive motor to a traction drive of the towing vehicle. The transmission arrangement comprises a transmission unit and a transmission device.

The transmission device may comprise a drive shaft and the drive shaft may be connected in terms of drive to the input side of the first and second clutches of the transmission unit. The traction motor may comprise a motor drive output shaft. The transmission arrangement, for example the transmission device, may be connected on the input side to the motor drive output shaft, for example to an input-side shaft of the transmission arrangement, such as to an input-side shaft of the transmission device or of the transmission unit, with the result that the transmission arrangement can be in drive connection with the motor drive output shaft and can be driven by the motor drive output shaft. In terms of force flow and torque flow, starting from a traction motor mounted upstream of the transmission arrangement in terms of force flow and torque flow, the transmission arrangement may thus have the transmission device and, mounted downstream, the transmission unit. In some embodiments, the transmission device may thus be mounted upstream of the transmission unit. Similarly, however, the transmission unit may also be mounted upstream of the transmission device. The transmission arrangement according to the disclosure has the above-described advantages of the transmission unit according to the disclosure. Since the transmission arrangement may be a transmission device, for example a multi-stage transmission, with a downstream transmission unit according to the disclosure, for example may be a dual clutch transmission with two winding path gear ratio stages, it is thus advantageously possible to realize a maximum number of gear ratio stages with a minimum number of shafts and toothed wheels in the transmission arrangement. This makes it possible to achieve a very small installation space and an optimally simple design of the transmission arrangement. Furthermore, the transmission arrangement achieves an optimum transmission spread on account of the for example six usable gear ratio stages (group gear ratio stages) with different transmission ratios of the transmission unit in combination with the gear ratio stages of the transmission device, for example a transmission device with four powershift ratio stages of the multi-stage transmission. Advantageously, both the transmission unit and the transmission device make it possible to perform powershifts, with the result that the transmission arrangement as a whole is capable of performing powershifts. Furthermore, the combination of the transmission unit with the upstream transmission device achieves an optimum transmission stepping for agricultural towing vehicles, which is ideal for the full scope of operating ranges of agricultural towing vehicles. Optimally, a maximum speed of 50 km/h and a minimum speed in the region of approximately 2 km/h is ideal for an agricultural towing vehicle in this performance segment. In the field of agricultural machines, in which geometric transmission stepping is required, this is a transmission arrangement with a simple design and/or is an optimum arrangement, for example in terms of structural space and shiftability. By contrast, in the automotive field gradual gear stepping is desired, on account of which a combination of two downstream transmission units is rather disadvantageous in that context, because it virtually necessitates geometric stepping.

In one configuration of the disclosure, the transmission device comprises a range transmission, for example a single-stage transmission or a multi-stage transmission, or a continuously variable transmission. The multi-stage transmission can for example be shifted into a plurality of powershift ratio stages, for example is fully powershiftable and/or the multi-stage transmission comprises a planetary gear set with one or more planetary stages, for example a planetary gear set with three integrated planetary stages, and a clutch arrangement assigned to the planetary stages. The clutch arrangement may for example comprise an additional direct gear. Moreover, the clutch arrangement may comprise one or more clutch units, which may be in the form of clutches, for example in the form of brakes. In this respect, the brake can be understood to mean a clutch which has a stationary input or output side, that is to say the input or output side of which is connected to a housing, for example. The planetary gear set may have a ring gear driven by the motor drive output shaft, for example may have a shaft which can be connected to the motor drive output shaft and can be in drive connection with the motor drive output shaft and driven by it. The planetary gear set may moreover comprise a planet gear carrier, which comprises one or more planet gears for each planetary stage, for example two, three or four planet gears per planetary stage, which for example can be rotationally fixedly connected to the planet gear carrier. Each planetary stage may moreover comprise a respective sun gear, each of which is connected, for example rotationally fixedly connected, to a shaft, for example a hollow shaft. The respective shaft may be connected to a respective clutch unit. In this respect, the planet gears assigned to one planetary stage may roll on the respectively assigned sun gear. Furthermore, the clutch arrangement may comprise an additional direct gear, for example two clutch units can be couplable by means of a direct clutch. In some embodiments, the multi-stage transmission comprises the planetary gear set with three integrated planetary stages. The first planetary stage may comprise a first sun gear, which is connected, for example can be rotationally fixedly connected, to a first planet shaft. The first planet shaft in turn may be connected to the first clutch unit. The second planetary stage may comprise a second sun gear, which can be connected, for example can be rotationally fixedly connected, to a second planet shaft. The second planet shaft in turn may be connected to the second clutch unit. The third planetary stage may comprise a third sun gear, which can be connected, for example can be rotationally fixedly connected, to a third planet shaft. The third planet shaft in turn may be connected to the third clutch unit. The first, the second and the third clutch unit may for example be in the form of brakes. In this case, the respective input side of the respective clutch unit is connected to the respective sun gear and the respective planet shaft and the output side of the respective clutch unit is connected to a housing, for example the transmission housing. Furthermore, the second and the third clutch units may be couplable. The first, the second and the third clutch unit may be in the form of a multi-plate clutch, for example a friction clutch. In some embodiments, the multi-stage transmission comprises four gears. The multi-stage transmission may be shiftable by selectively actuating the clutch arrangement into at least two powershift ratio stages, for example into four powershift ratio stages. The transmission arrangement in general may comprise the transmission unit, which is shiftable into a number of gear ratio stages, for example six group gear ratio stages, and may comprise the transmission device, which is shiftable into further gear ratio stages, for example four powershift ratio stages, with the result that, depending on a selected powershift ratio stage and a selected group shift ratio stage, a number of transmission ratios, for example 4 times 6 transmission ratios, for example gears, can be set between an output and an input of the transmission arrangement. Advantageously, the transmission arrangement, for example the multi-stage transmission, has the above-mentioned advantages of the transmission arrangement. The transmission arrangement is distinguished in that the transmission arrangement can be used to establish such transmission ratios that at most two of the clutches and/or clutch units need to be actuated to set the next lower or the next higher transmission ratio of the transmission arrangement. Furthermore, the gear ratio stages of the transmission unit can be matched to the powershift ratio stages of the transmission device such that, in the event of changing groups, i.e., a shifting operation, during which it is necessary to change a gear ratio stage of the transmission unit and a powershift ratio stage at the same time to achieve the next lower (or next higher) transmission ratio of the transmission arrangement, a change at least between two extreme (highest and lowest) powershift ratio stages of the transmission device is avoided, since changing between the extreme powershift ratio stages requires particularly high shifting complexity. This can be advantageously realized as a result since the transmission arrangement is a combination of a transmission unit according to the disclosure with a range transmission, for example a multi-stage transmission.

The transmission arrangement may have a shaft leadthrough for a power takeoff drive of the agricultural vehicle. To that end, the shafts of the transmission device and the first and the second input shaft of the transmission unit and/or the drive shaft of the transmission device and/or the clutch drive shaft may be in the form of hollow shafts and may incorporate the power takeoff drive shaft for the purpose of driving a power takeoff transmission. Expediently, the planetary gear set of the transmission device and/or the first and the second clutch may also have a central leadthrough for the power takeoff drive shaft. The capability for adaptation to a specified installation environment also plays a role in the design of the transmission arrangement. Accordingly, the transmission arrangement may advantageously furthermore have a transmission housing which accommodates at least the transmission unit and in which the power takeoff drive shaft for driving the power takeoff transmission can be arranged. The power takeoff drive shaft may for example be arrangeable coaxially with the first and the second input shaft of the transmission unit.

Advantageously, the transmission arrangement, for example the transmission device, comprises a powershift reversing unit, for example a power reverser (reversing device), for reversing the direction of travel, for example a powershiftable or non-powershiftable powershift reversing unit, and/or the powershift reversing unit is mounted upstream of the transmission unit, for example is mounted upstream or downstream of a range transmission, for example multi-stage transmission, of the transmission device. The powershift reversing unit may be a powershift reversing unit actuable by a clutch arrangement. The powershift reversing unit makes it possible to be able to reverse a direction of rotation of the drive output of the transmission arrangement, for example of the output shaft. The powershift reversing unit may be mounted downstream of a range transmission of the transmission device, with the result that the clutch drive shaft is connected, for example rotationally fixedly connected, to an output-side shaft, for example hollow shaft, of the powershift reversing unit, and/or can be driven by the powershift reversing unit. In that case, on the input side, the powershift reversing unit can be in drive connection with and/or be driven by a shaft, for example a hollow shaft, of the planet gear carrier. However, the powershift reversing unit may also be mounted upstream of the range transmission, with the result that, in this embodiment, the powershift reversing unit can be connected to, for example can be in drive connection with, the motor drive output shaft, for example hollow shaft, and/or can be driven by the motor drive output shaft. In that case, the powershift reversing unit may comprise a shaft, for example a hollow shaft, which is connected to the transmission arrangement, for example the input side of the transmission device, for example to the ring gear, so that said transmission arrangement can be driven. In some embodiments, the powershift reversing unit may have a planetary design, for example may be in the form of a planetary stage with a brake. Furthermore, the powershift reversing unit may be coaxial with an input shaft of the transmission arrangement. In some embodiments, the powershift reversing unit may be arranged on the output side of the multi-stage transmission. The planetary design achieves a particularly short axial overall length, this also having an advantageous overall effect on the overall length of the shift transmission arrangement.

The disclosure also relates to an agricultural towing vehicle, for example a tractor or a construction machine, having a transmission unit or a transmission arrangement. The agricultural vehicle may moreover comprise a traction motor. In this case, the transmission arrangement may be drivable by the traction motor and be in drive connection with at least one vehicle axle of the towing vehicle and/or may be able to be placed in drive connection with a further drive axle of the towing vehicle. The towing vehicle according to the disclosure has the above-described advantages of the transmission unit and/or transmission arrangement according to the disclosure.

The transmission unit according to the disclosure, the transmission arrangement according to the disclosure and the towing vehicle according to the disclosure advantageously have a considerably narrower design and manage with little structural space, weight and moment of inertia, in comparison with the conventional powershift transmissions (PST), as are used in large towing vehicles. As a result, the design is more cost-effective and provides greater savings on fuel owing to better efficiency. In comparison with various partial powershift transmissions (PPST), as are used in various medium and smaller towing vehicles, in this respect the functionality toward fully powershiftable transmissions is improved. For example when shifting over from one group to the next, it is advantageous that the towing force is no longer interrupted and work can be continued at full load, both in the field and during transport. This is done with reduced additional weight and structural space requirements, for example compared to conventional, fully powershiftable transmissions, for the same degree of performance is attained.

BRIEF DESCRIPTION OF THE DRAWINGS

The disclosure as well as further advantages and advantageous refinements and configurations of the disclosure, both in terms of the hardware and the method, will be explained in more detail below on the basis of exemplary embodiments and with reference to the drawing. In the drawings, components which correspond or are comparable in terms of their function are denoted by the same reference signs. In the schematic drawings.

DETAILED DESCRIPTION

Figure 1:
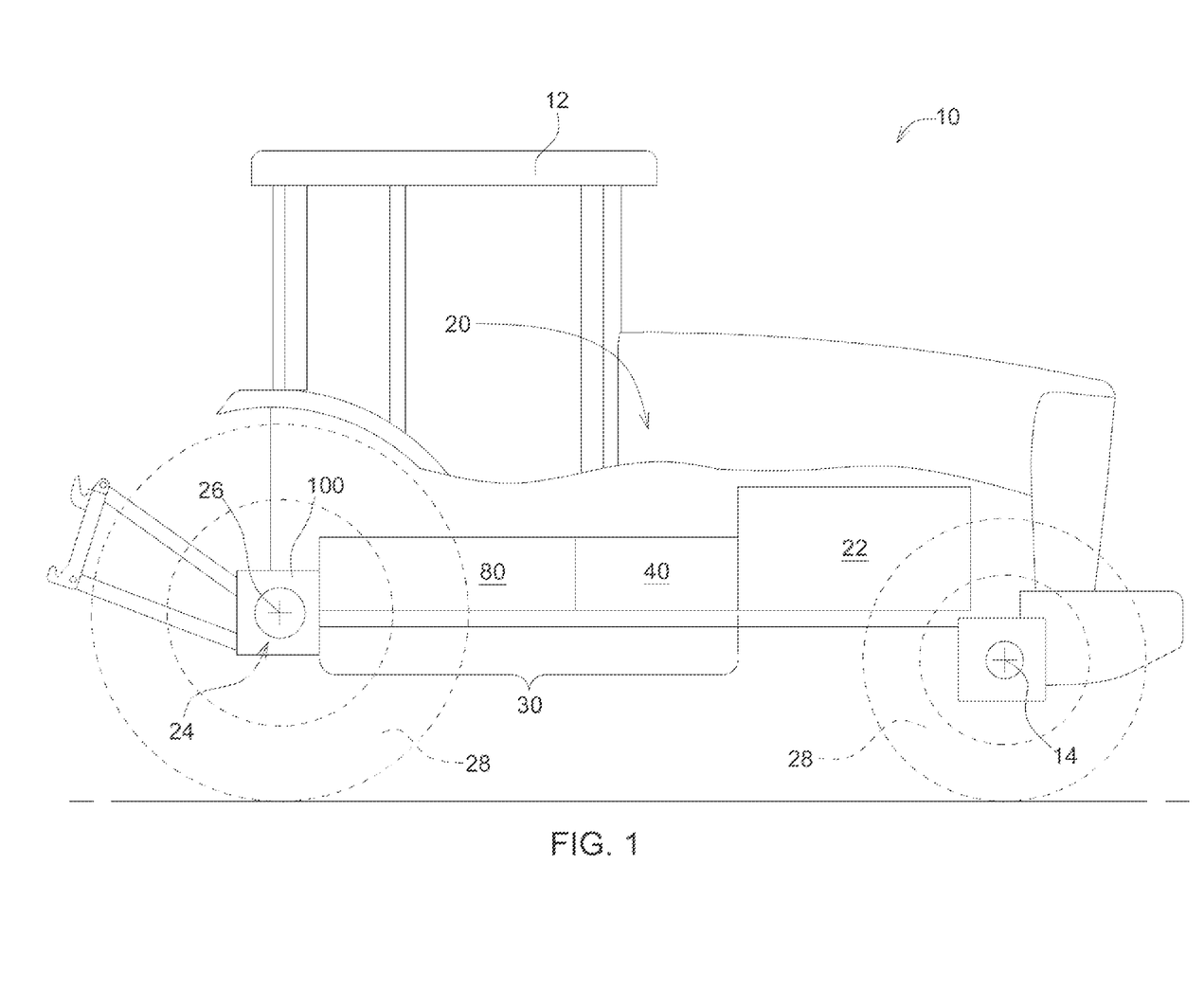
FIG. 1 shows a schematic illustration of an agricultural towing vehicle according to the disclosure.

FIG. 1 shows a schematic illustration of an agricultural towing vehicle 10 according to the disclosure, for example in the form of a tractor, with a drivetrain 20 in one possible configuration. The basic structure of an agricultural towing vehicle 10 is assumed to be known to a person skilled in the art. The towing vehicle 10 also comprises a cab 12, a front vehicle axle 14, and a rear vehicle axle 26. The front vehicle axle 14 and the rear vehicle axle 26 are part of the drivetrain 20, with it being possible for the rear vehicle axle 26 generally to be permanently driven and the front vehicle axle 14 generally to be driven shiftably as required.

The drivetrain 20 also comprises a drive motor 22, which may be in the form of an internal combustion engine, and a transmission structure which may be composed of various individual transmission components, as described below. The transmission structure described in the present case, in terms of the force flow and torque flow and taking the traction motor 22 as a starting point, may have a transmission arrangement 30 according to the disclosure, a traction drive 24 and a rear-axle transmission 32. The transmission arrangement 30 comprises a transmission device 40 and a transmission unit 80 according to the disclosure. In this respect, the transmission device 40 is mounted downstream of the traction motor 22. The transmission device 40 is connected in terms of drive to the traction motor 22, and/or can be drivable by the traction motor 22. The transmission unit 80 is mounted downstream of the transmission device 40. In this respect, the transmission unit 80 is connected in terms of drive to the transmission device 40 and/or can be driven by the transmission device 40. The transmission arrangement 30 shown makes it possible to transmit drive power from the traction motor 22 to the output shaft of the transmission unit with different gear ratio stages. The rear vehicle axle 26, which is in drive connection with the output shaft and converts rotation of the front and/or the rear vehicle axle (via ground engagement means connected thereto) into propulsion of the tractor, is therefore driven at a different rotational speed independently of a gear ratio stage that is selected in the transmission arrangement. Consequently, a tractor equipped with the transmission arrangement, depending on the gear ratio stage that is selected in the transmission arrangement, can be moved in different speed ranges.

The towing vehicle 10 may have one or more ground engagement means in the form of wheels 28, which engage with an underlying surface to transmit drive forces and/or by way of which the towing vehicle 10 is supported on the underlying surface. The towing vehicle 10 may moreover have a chassis, it being possible for the chassis for example to be borne by the wheels 28 suspended on the front and the rear vehicle axle 14, 26.

Figure 2:
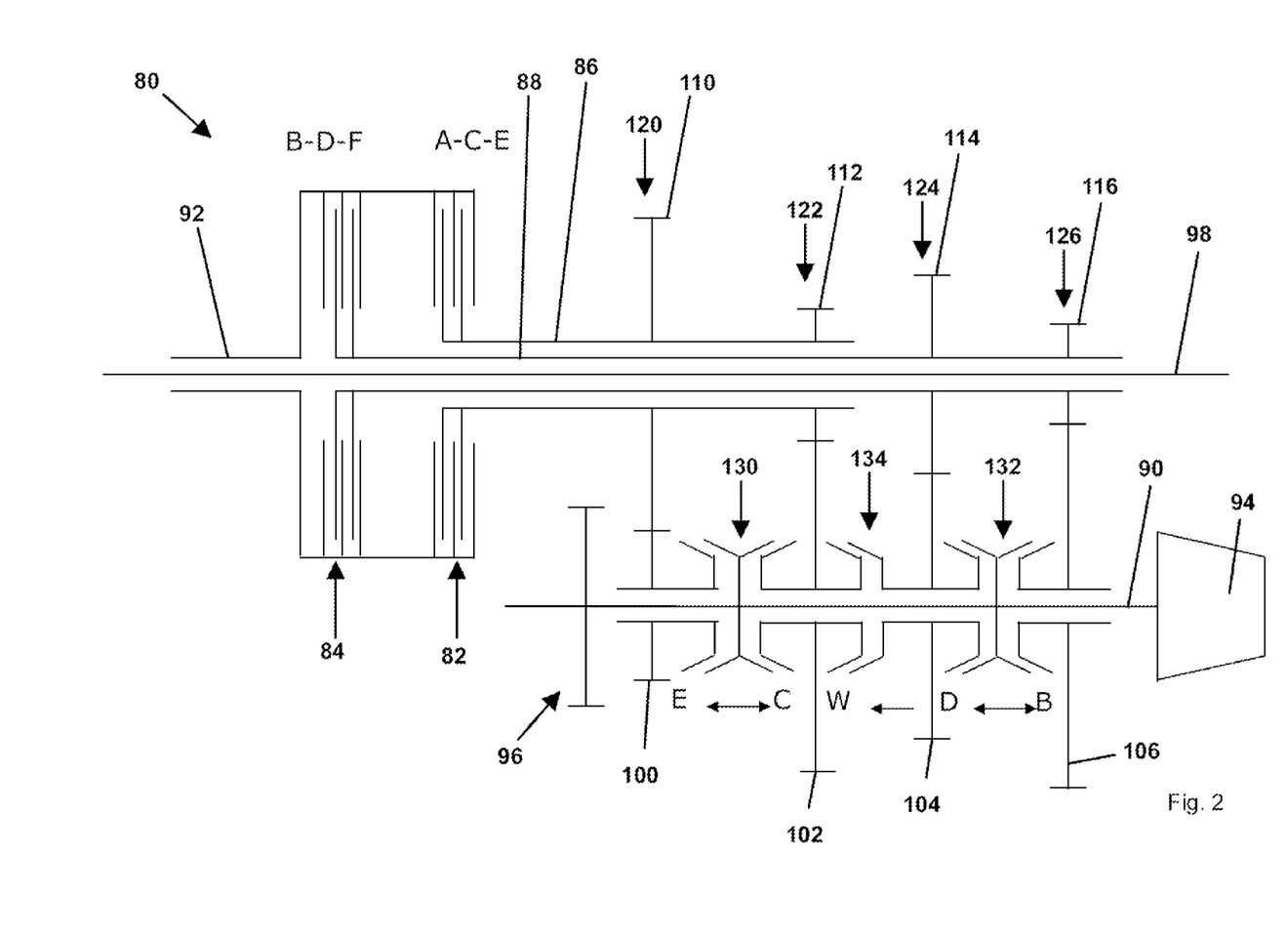
FIG. 2 shows a schematic illustration of a first exemplary embodiment of the transmission unit according to the disclosure.

FIG. 2 shows a schematic illustration, for example a sequence, of a first exemplary embodiment of the transmission unit 80 according to the disclosure. The transmission unit 80 shown in FIG. 2 is a detailed schematic illustration of the transmission unit 80 shown in FIG. 1. Therefore, details not shown in FIG. 1 will be discussed below. The agricultural vehicle 10 may comprise the transmission unit 80 as illustrated in FIG. 1.

The transmission unit 80 comprises a first clutch 82 and a second clutch 84, the input side of which, for example the common input side of which, can be driven. The input side may be connected to, and for example may be drivably connected to or driven by, a drive shaft (reference sign 200, FIG. 5) of the transmission device 40 The transmission unit 80 further comprises a first input shaft 86 and a second input shaft 88 and an output shaft 90, for example one output shaft 90. The output side of the first clutch 82 is rotationally fixedly connected to the first input shaft 86, for example the first clutch 82 is rotationally fixedly connected to the first input shaft 86. The output side of the second clutch 84 is rotationally fixedly connected to the second input shaft 88, for example the second clutch 84 is rotationally fixedly connected to the second input shaft 88. The transmission unit 80 comprises a clutch drive shaft 92 as input side. The first and the second clutch 82, 84 can be moved and/or shifted between an open state, in which the clutch drive shaft 92 is released in terms of drive from the first and/or the second input shaft 86, 88, and a closed state, in which the clutch drive shaft 92 is in drive connection with the first and/or the second input shaft 86, 88. Furthermore, a rear-axle bevel gear drive 94 is connected to the output shaft 90. In this case, the pinion of the rear-axle bevel gear drive 94 may be in the form of part of the output shaft 90, for example be incorporated in the output shaft 90. The output shaft 90 is moreover also connected to a toothset of a front-axle drive by means of a front-axle drive wheel 96. The front-axle drive wheel 96 is moreover identical to a parking lock wheel 96.

Moreover, the first and/or the second input shaft 86, 88 are in the form of hollow shafts and the first input shaft 86 is arranged in the second input shaft 88. Furthermore, the first and/or the second input shaft 86, 88 incorporate a power takeoff drive shaft 98 for driving a power takeoff transmission.

Four shift wheels 100, 102, 104, 106 are rotatably mounted on the output shaft 90. In total, four fixed wheels 110, 112, 114, 116 are rotationally fixedly arranged on the first and the second input shaft 86, 88, for example are rotationally fixedly connected to the first and the second input shaft 86, 88. In this respect, the first and the second input shaft 86, 88 are respectively assigned two fixed wheels. Each of these meshes with one of the shift wheels 100, 102, 104, 106 assigned to the output shaft 90. The transmission unit 80 has multiple gear sets, for example four gear sets 120, 122, 124, 126, for establishing gear ratio stages B, C, D, E. To that end, at least a first gear set 120 and a second gear set 122 have the fixed wheel 110, 112, respectively, on the first input shaft 86 and the shift wheel 100, 102, respectively, on the output shaft 90. Moreover, at least a third gear set 124 and a fourth gear set 126 have the fixed wheel 114, 116, respectively, on the second input shaft 88 and the shift wheel 104, 106, respectively, on the output shaft 90. In some embodiments, the first gear set 120 comprises a first fixed wheel 110, which meshes with a first shift wheel 100 on the output shaft 90. The second gear set 122 comprises a second fixed wheel 112, which is in engagement with a second shift wheel 102. The third gear set 124 comprises a third fixed wheel 114, which meshes with a third shift wheel 104. The fourth gear set 126 comprises a fourth fixed wheel 116, which is in engagement with a fourth shift wheel 106.

The transmission unit 80 also comprises two coupling elements 130, 132, that is to say a first coupling element 130 and a second coupling element 132. The first coupling element 130 is arranged between the first and the second gear set 120, 122 and the second coupling element 132 is arranged between the third and the fourth gear set 124, 126 on the output shaft 90. The shift wheels 100, 102, 104, 106 are rotationally fixedly and releasably connectable to the output shaft 90 by means of the first or the second coupling element 130, 132. In some embodiments, the first shift wheel 100 or the second shift wheel 102 is thus rotationally fixedly and releasably connectable to the output shaft 90 by means of the first coupling element 130. Moreover, the third shift wheel 104 or the fourth shift wheel 106 is rotationally fixedly and releasably connectable to the output shaft 90 by means of the second coupling element 132. Consequently, a respective coupling element 130, 132 is arranged between two respective shift wheels 100, 102, 104, 106, which are arranged on the same input shaft 86, 88, that is to say the first or second input shaft 86, 88. The first and the second coupling element 130, 132 are rotationally fixedly and axially displaceably mounted on the output shaft 90. The first and the second coupling element 130, 132 are in the form of shift assemblies, which comprise actuating mechanisms, for example sliding sleeves, and synchronized rings. As a result, the rotatably mounted shift wheels 100, 102, 104, 106 can be shifted via the coupling elements 130, 132, with the result that a respective fixed rotational speed ratio can be established between the output shaft 90 and the respective first and/or second input shaft 86, 88 irrespective of a shifting state of the coupling elements 130, 132.

The transmission unit 80 moreover comprises a shift element 134 for coupling two shift wheels 102, 104. In some embodiments, the second and the third shift wheel 102, 104 can be coupled to the shift element 134. The second and the third shift wheel 102, 104 are rotationally fixedly and releasably connectable to the shift element 134. The second and the third shift wheel 102, 104 can be coupled, for example selectively coupled, to the shift element 134 in such a way that at least one winding path gear ratio stage A, F can be formed via the second and the third gear set 122, 124, i.e., for example the first and the second input shaft 86, 88 are thus couplable to one another. In other words, the shift element 134 may for example be movable between a first shift position, in which the second shift wheel 104 and the third shift wheel 102 are coupled, and a second shift position, in which the second shift wheel 104 and the third shift wheel 102 are released from one another. The shift element 134 is in the form of a synchronizer acting on one side. The shift element 134 is arranged between the first and the second coupling element 130, 132 along the output shaft 90.

Depending on the shifting state of the first and the second clutch 82, 84 and on the shifting state of the first and the second coupling element 130, 132 and the shift element 134, the transmission unit 80 can be shifted with each of the clutches 82, 84 in two gear ratio stages, i.e., a total of four gear ratio stages B, C, D, E, and in each case an additional gear ratio stage as a winding path gear ratio stage A, F, i.e., a total of two winding path gear ratios stage A, F, and thus shifted in a total of six gear ratio stages or group gear ratio stages. In this respect, the transmission unit 80 can be shifted under load in that while the first clutch, for example the first clutch 82, is being opened, the second clutch, for example the second clutch 84, is closed, with the result that a drive connection existing between the first or the second input shaft 86, 88 and the clutch drive shaft 92 can be replaced by a drive connection to be established via the respective other input shaft 86, 88, without interrupting a drive connection between the first or the second input shaft 86, 88 and the output shaft 90. To preselect a desired gear ratio stage, the shift wheel in question, that is to say for example the first to the fourth shift wheel 100, 102, 104, 106, is rotationally fixedly connected to the output shaft 90 by the respective assigned first or second coupling element 130, 132, with the result that the gear ratio stages B, C, D, E are realized. If a gear ratio stage A, F as a winding path gear ratio stage is shifted, the second and the third shift wheel 102, 104 are rotationally fixedly connected to one another by the shift element 134, and at the same time the gear ratio stages E or B are activated, that is to say at the same time the first shift wheel 100 is connected to the output shaft 90 by the first coupling element 130 (gear ratio stage E) or the fourth shift wheel 106 is connected to the output shaft by the second coupling element 132 (gear ratio stage B). Consequently, each winding path gear ratio stage runs over three gear sets. The transmission unit 80 thus comprises six gear ratio stages, which for example are powershiftable. In some embodiments, the first and the sixth gear ratio stage A, F are a winding path gear, i.e., realized as a winding path gear ratio stage.

Figure 3:
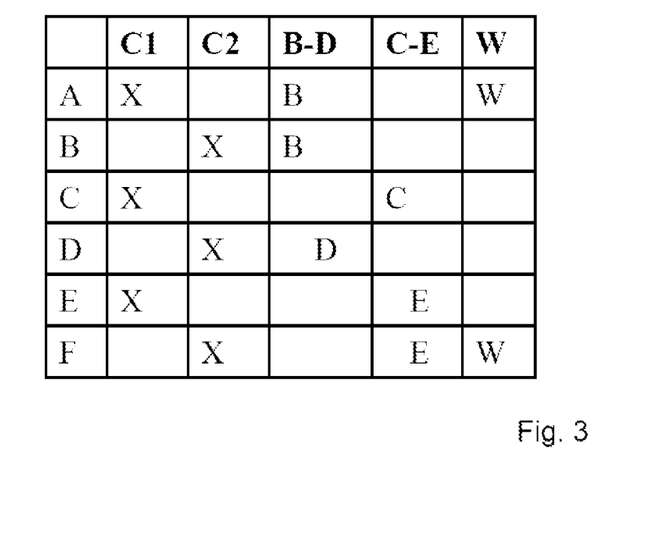
FIG. 3 shows a schematic illustration of an engagement sequence diagram of the first exemplary embodiment of the transmission unit according to the disclosure, and FIGS. 4a-f each show a schematic illustration of the first exemplary embodiment of the transmission unit according to the disclosure and the power flows of the gear ratio stages A to F of the transmission unit.

FIG. 3 shows a schematic illustration of an engagement sequence for the first exemplary embodiment of the transmission unit 80 according to the disclosure. The engagement sequence shown in FIG. 3 for the transmission unit comprises the features of the transmission unit 80 shown in FIGS. 1 and 2, and therefore details and/or points of differentiation will be discussed below. According to the engagement sequence indicated in the table, the first gear ratio stage A is shifted via the first clutch 82, via the second coupling element 132 displaced in a direction B, and via the activated shift element 134, that is to say the shift element 134 displaced in a direction W, as a winding path gear ratio stage. The second gear ratio stage B is realized via the second clutch 84 and via the second coupling element 132 displaced in a direction B. The third gear ratio stage C is shifted via the first clutch 82 and via the first coupling element 130 displaced in a direction C. The fourth gear ratio stage D is also realized via the second clutch 84 and via the second coupling element 132 displaced in a direction D. The fifth gear ratio stage is realized via the first clutch 82 and via the first coupling element 130 displaced in a direction E. The sixth gear ratio stage F is shifted via the second clutch, via the first coupling element 130 displaced in a direction E, and via the shift element 134 displaced in a direction W, as a winding path gear ratio stage F. In this respect, the displacement of the coupling elements 130, 132 and/or of the shift element 134 is synonymous with an axial displacement of the first or the second coupling element 130, 132 and/or of the shift element 134 and the rotationally fixed connection of the assigned shift wheel 100, 102, 104, 106 to the output shaft 90 by way of the first or the second coupling element 130, 132 and/or the rotationally fixed connection of the second and the third shift wheel 102, 104, while still being rotatably arranged on the output shaft 90.

FIGS. 4a-f show a schematic illustration, for example a sequence, of the first exemplary embodiment of the transmission unit 80 according to the disclosure and the power flows of the gear ratio stages A to F of the transmission unit 80. The transmission unit 80 shown in FIGS. 4a to 4f corresponds substantially to the transmission unit 80 shown in FIGS. 1 to 3, and therefore details and/or points of differentiation will be discussed below.

Figure 4A:
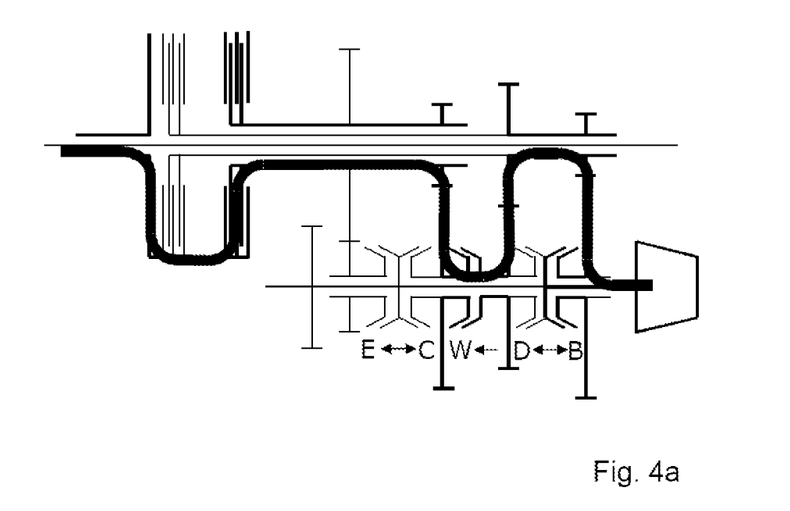
Figure 4B:
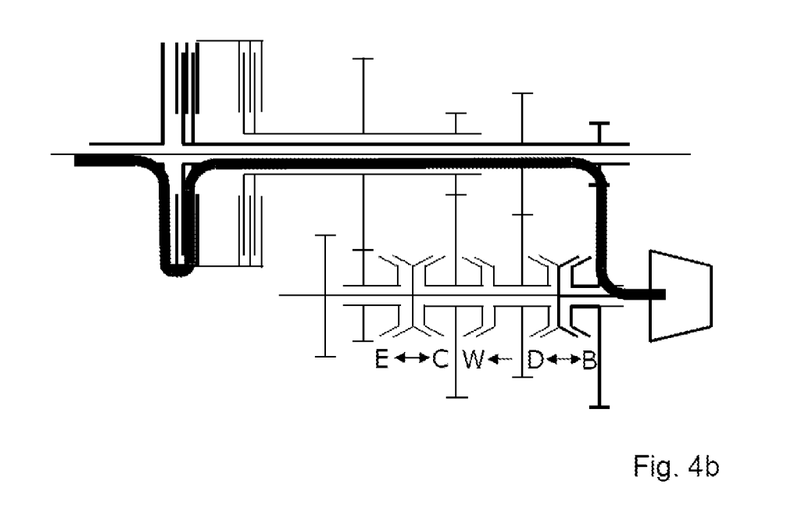
Figure 4C:
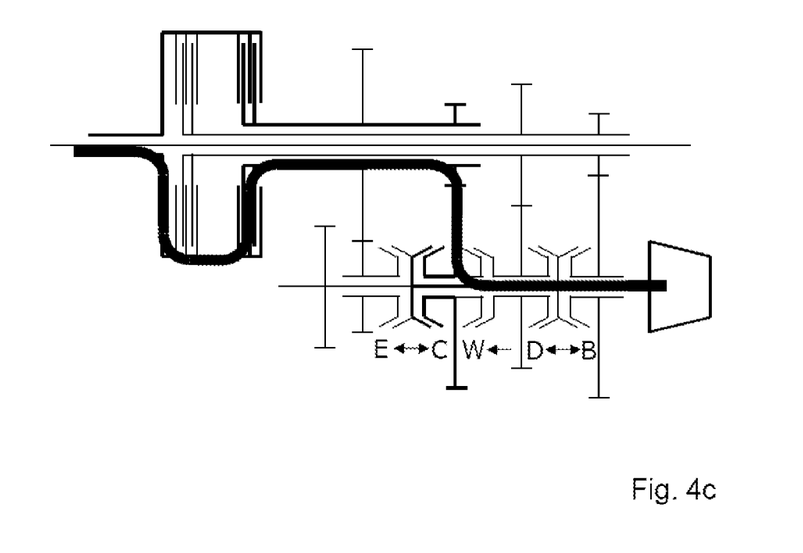
Figure 4D:
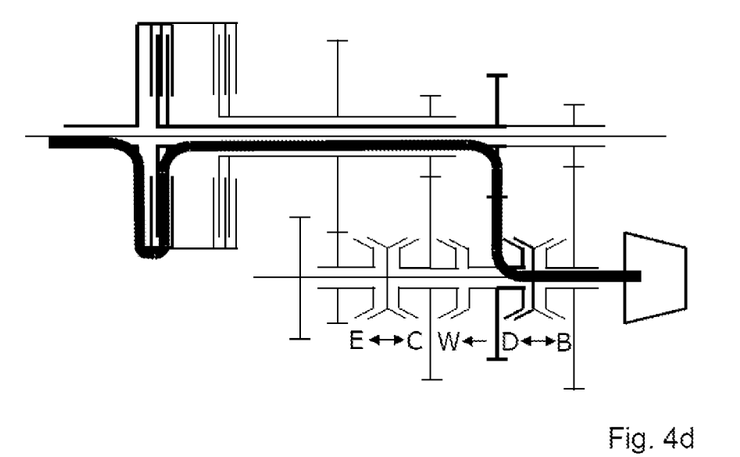
Figure 4E:
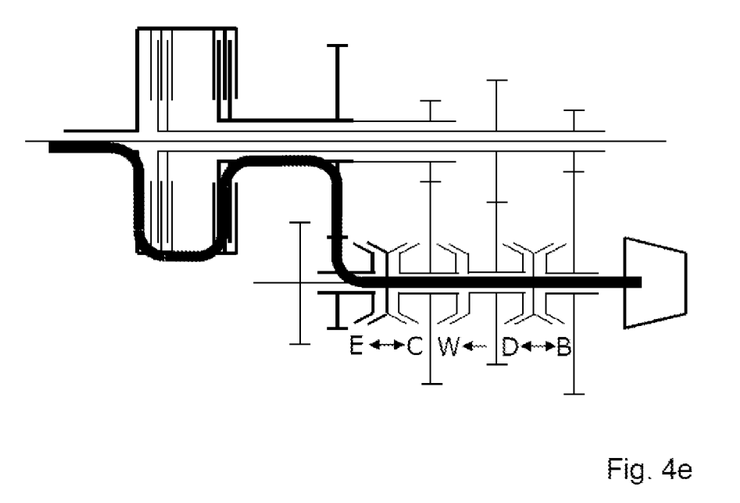
Figure 4F:
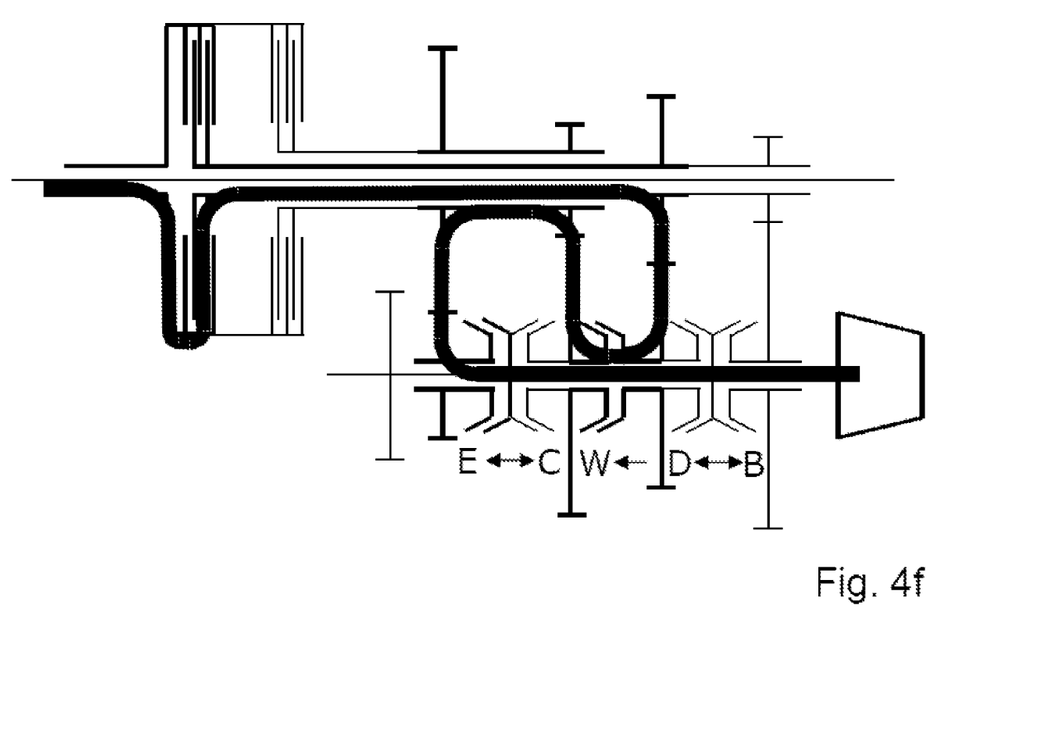

FIG. 4a shows the first gear ratio stage A, which is realized as a winding path gear ratio stage via the second, the third and the fourth gear set 122, 124, 126. FIG. 4b shows the second gear ratio stage B, which uses the fourth gear set 126. FIG. 4c shows how the second gear set 122 is utilized to realize the third gear ratio stage C. FIG. 4d shows the fourth gear ratio stage D, in which the third gear set 124 is utilized. FIG. 4e shows the fifth gear ratio stage E, which uses the first gear set 120. FIG. 4f shows the sixth gear ratio stage F, which is realized as a winding path gear ratio stage and utilizes the first to the third gear set 120, 122, 124. As shown in FIGS. 4a and 4f, the highest gear ratio stage, that is to say the sixth gear ratio stage F, and the lowest gear ratio stage, that is to say the first gear ratio stage A, are realized as winding path gear ratio stages.

Figure 5:
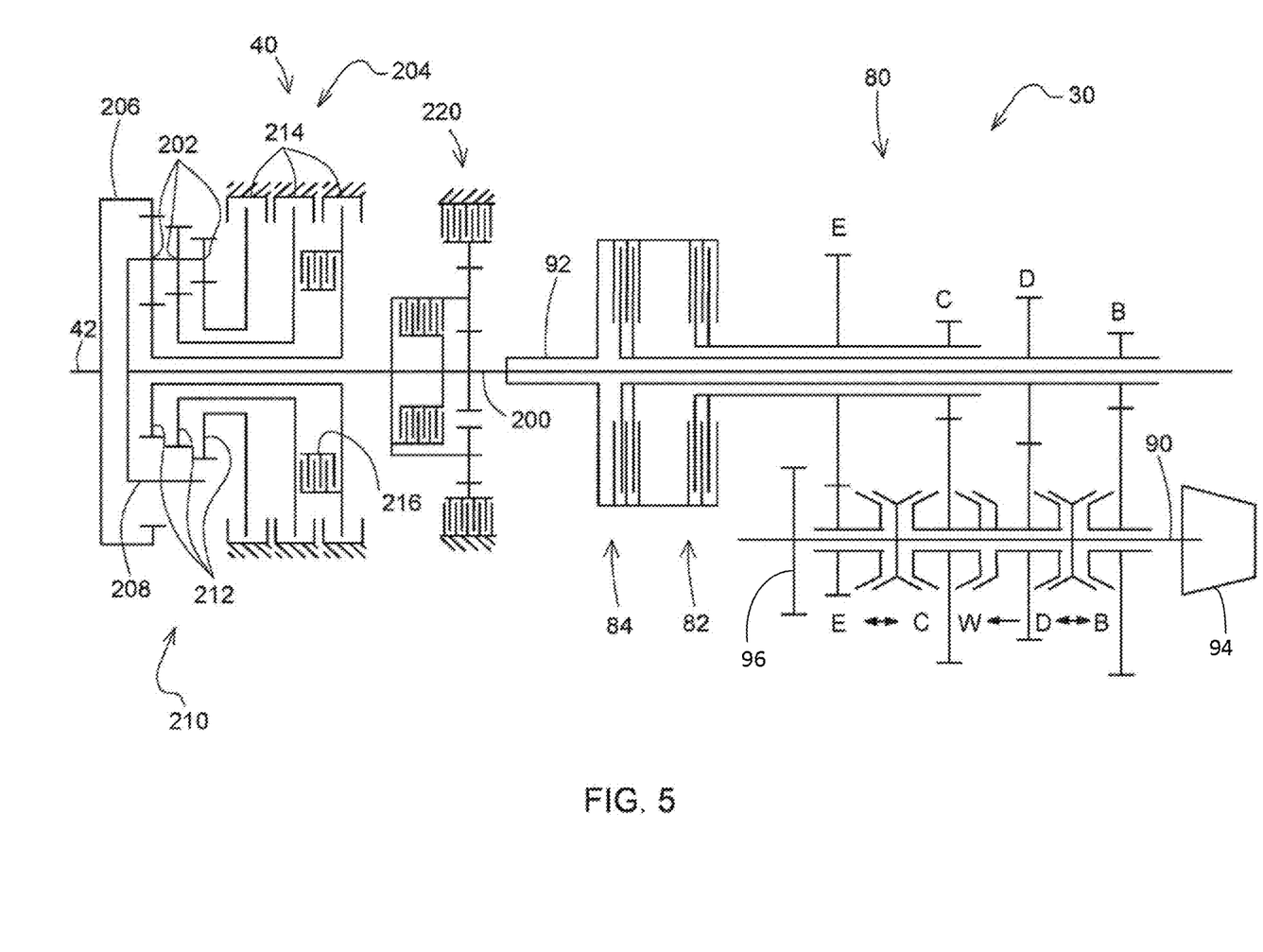
FIG. 5 shows a schematic illustration of a first exemplary embodiment of the transmission arrangement according to the disclosure.

FIG. 5 shows a schematic illustration, for example a sequence, of a first exemplary embodiment of the transmission arrangement 30 according to the disclosure. The transmission unit 30 shown in FIG. 5 comprises the transmission unit 80, the transmission unit 80 substantially corresponding to the transmission unit 80 shown in FIGS. 1 to 4f, and therefore details and/or points of differentiation will be discussed below. The transmission arrangement 30 is intended for a drivetrain 20 of an agricultural towing vehicle 10, in order to connect a traction motor 22 to a traction drive 24 of the vehicle 10. The transmission arrangement 30 comprises the transmission unit 80 described and a transmission device 40. The transmission device 40 is mounted upstream of the transmission unit 80. The transmission device 40 comprises a drive shaft 200, which is connected in terms of drive to the input side, for example the clutch drive shaft 92, of the first and the second clutches 82, 84 of the transmission unit 80.

The transmission arrangement 30 comprises basically two functional groups, which are in drive connection with one another via shafts. The transmission device 40 is arranged on the input side of the transmission arrangement 30. The transmission device 40 may be in drive connection with the traction motor 22 and be driven by the traction motor 22. The transmission device 40 is in drive connection with the transmission unit 80 via a drive shaft 200, which is in the form of a hollow shaft. The transmission unit 80 has the output shaft 90, which at the same time is the drive output shaft of the transmission arrangement 30, on the output side.

The transmission device 40 is in the form of a multi-stage transmission having a plurality of powershift ratio stages, in this instance four powershift stages. The transmission device may for example be powershiftable, for example fully powershiftable. The transmission device 40 has a planetary design. Furthermore, the transmission device 40 may be arranged coaxially with the clutch drive shaft 92 of the transmission unit 80 and/or of a motor drive output shaft 42. The transmission device 40, for example the multi-stage transmission, comprises a planetary gear set 210 with three integrated planetary stages 202. The transmission device 40 moreover also has a clutch arrangement 204 assigned to the planetary stages 202. The planetary gear set 210 further comprises a ring gear 206, driven by the motor drive output shaft 42, and a planet gear carrier 208, which comprises one or more planet gears for each planetary stage 202, for example two, three or four planet gears per planetary stage, which can be rotationally fixedly connected to the planet gear carrier 208. Each planetary stage moreover comprises a respective sun gear 212, each of which is rotationally fixedly connected to a hollow shaft. The respective hollow shaft is connected to a respective clutch unit 214, it for example being possible for the clutch unit 214 to be in the form of a brake. In this respect, the planet gears assigned to one planetary stage may roll on the respectively assigned sun gear 212. Furthermore, the clutch arrangement 204 comprises an additional direct gear between two clutch units, i.e., the clutch units can be coupled by means of a direct clutch 216. In some embodiments, the transmission device 40 in the form of a multi-stage transmission comprises the planetary gear set 210 with three integrated planetary stages 202. The first planetary stage may comprise a first sun gear, which is connected, for example is rotationally fixedly connected, to a first planet shaft. The first planet shaft in turn is connected to the first clutch unit. The second planetary stage may comprise a second sun gear, which is connected, for example is rotationally fixedly connected, to a second planet shaft. The second planet shaft in turn is connected to the second clutch unit. The third planetary stage may comprise a third sun gear, which is connected, for example is rotationally fixedly connected, to a third planet shaft. The third planet shaft in turn is connected to the third clutch unit. Furthermore, the second and the third clutch units may be couplable by means of the direct clutch 216. Furthermore, the transmission arrangement 30, for example the transmission device 40, may comprise a powershift unit 220 for reversing the direction of travel. In that case, the powershift reversing unit 220 is mounted upstream of the transmission unit 80 and downstream of the multi-stage transmission. The planet gear carrier 208 is connected, for example rotationally fixedly connected, to the powershift reversing unit 220 by means of a shaft, the shaft being drivable by and/or in drive connection with the planet gear carrier 208.

Figure 6:
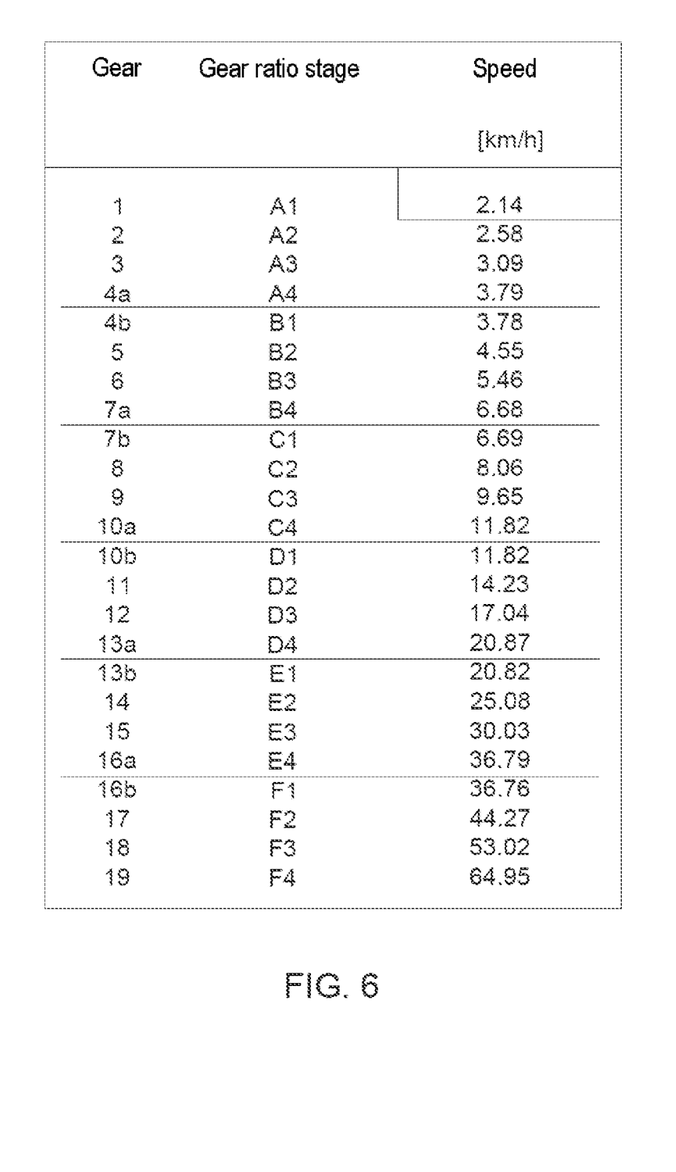
FIG. 6 shows a schematic table of a speed distribution depending on the gear ratio stages of the first exemplary embodiment of the transmission arrangement according to the disclosure.

FIG. 6 shows a table of a speed distribution depending on the gear ratio stages of the first exemplary embodiment of the transmission arrangement 30 according to the disclosure. FIG. 6 relates to the transmission unit 80 or transmission arrangement 30 shown in FIGS. 1 to 5, and therefore the points of differentiation will be discussed below. The table shows the individual gear ratio stages of the transmission arrangement 30. The gear ratio stages or group gear ratio stages A, B, C, D, E, F of the transmission unit 80 are each supplemented by the gear ratio stages or powershift ratio stages 1, 2, 3, 4 of the transmission device 40 per group gear ratio stage, resulting in total in 24 gear ratio stages for the transmission arrangement 30. The advantageous optimum and broad distribution of the speed of the towing vehicle between approximately 2 km/h and approximately 65 km/h is shown.

What is claimed is:

1. A transmission arrangement for a drivetrain of an agricultural towing vehicle, comprising:
    a power take-off drive shaft;
    a transmission unit, comprising:
        a first clutch and a second clutch;
        a first input shaft, a second input shaft, and an output shaft, wherein the first clutch is connected to the first input shaft and the second clutch is connected to the second input shaft; and
        a plurality of gear sets for establishing a plurality of gear ratio stages, each of the plurality of gear sets including a shift wheel rotatably mounted on the output shaft and a fixed wheel arranged on one of the first and second input shafts, wherein a first gear set and a second gear set of the plurality of gear sets each have the fixed wheel on the first input shaft and the shift wheel on the output shaft, wherein a third gear set and a fourth gear set of the plurality of gear sets each have the fixed wheel on the second input shaft and the shift wheel on the output shaft, wherein the shift wheel of the second gear set and the shift wheel of the third gear set can be selectively coupled to a shift element such that at least one winding path gear ratio stage can be formed via the second and the third gear set; and
    a multi-stage transmission which can be shifted into a plurality of powershift ratio stages, the multi-stage transmission includes a planetary gear set with three integrated planetary stages and a clutch arrangement including three clutch units and a direct clutch coupled directly between two of the three clutch units;
    wherein at least one of the first clutch or the second clutch defines a central passage, and wherein the power-take-off drive shaft is disposed in the central passage.

2. The transmission arrangement of claim 1, wherein the shift element is movable between a first shift position, in which the shift wheel of the second gear set and the shift wheel of the third gear set are coupled, and a second shift position, in which the shift wheel of the second gear set and the shift wheel of the third gear set are released from one another.

3. The transmission arrangement of claim 1, wherein the shift wheels are rotationally fixedly and releasably connectable to the output shaft via two coupling elements.

4. The transmission arrangement of claim 3, wherein the two coupling elements are rotationally fixedly and axially displaceably mounted on the output shaft and axially displaceable via an actuating element.

5. The transmission arrangement of claim 4, wherein the shift element is arranged between the two coupling elements along the output shaft, and the shift element is in the form of a synchronizer acting on one side.

6. The transmission arrangement of claim 1, wherein a highest gear ratio stage and a lowest gear ratio stage of the plurality of gear ratio stages are realized as a winding path gear ratio stage.

7. The transmission arrangement of claim 1, wherein a rear-axle bevel gear drive is connected to the output shaft, which is connected to a front-axle drive wheel or a parking lock wheel.

8. The transmission arrangement of claim 7, wherein a pinion of the rear-axle bevel gear drive is integrated in the output shaft.

9. The transmission arrangement of claim 1, wherein the power-take-off drive shaft is arranged in the first and second input shafts.

10. The transmission arrangement of claim 1, wherein the plurality of gear ratio stages comprises six gear ratio stages and the first and the sixth gear ratio stages are realized as winding path gear ratio stages.

11. The transmission arrangement of claim 1, further comprising:
    a clutch drive shaft connecting to the multi-stage transmission.

12. The transmission arrangement of claim 1, wherein the transmission device comprises a powershift reversing unit for reversing the direction of travel.

13. An agricultural towing vehicle comprising the transmission arrangement of claim 1.

14. The transmission arrangement of claim 1, wherein the three integrated planetary stages of the planetary gear set are coaxial.

15. The transmission arrangement of claim 1, wherein an input side of the transmission unit is driven by a drive shaft, wherein the multi-stage transmission is in drive connection with the transmission unit via the drive shaft, and wherein the planetary gear set further comprises a ring gear driven by a motor drive output shaft, wherein the multi-stage transmission is driven by a traction motor.

16. The transmission arrangement of claim 1, wherein the multi-stage transmission further comprises a planet gear carrier including planet gears for the three integrated planetary stages.

17. The transmission arrangement of claim 1, wherein the first clutch and the second clutch define the central passage, wherein the power-take-off drive shaft is disposed coaxially within the central passage of the first clutch and the second clutch, and wherein the power-take-off drive shaft is disposed coaxially with the first and the second input shafts.

18. The transmission arrangement of claim 1, wherein the first and second input shafts are hollow shafts receiving the power-take-off drive shaft coaxially therein.

19. The transmission arrangement of claim 1, wherein the planetary gear set defines another central passage receiving the power take-off drive shaft.

\* \* \* \* \*